Patented Nov. 7, 1933

1,934,143

UNITED STATES PATENT OFFICE 1,934,143

PRODUCTION OF SULPHAMINIC ACIDS OF 2 - AMINOANTHRAHYDROQUINONE SULPHURIC ACID ESTERS

Roger Ratti, Basel, Switzerland, assignor to the firm Durand & Huguenin S. A., Basel, Switzerland No Drawing. Application August 31, 1931, Serial No. 560,490, and in Germany September 5, 1930

6 Claims. (Cl. 260—98)

It is known (see U. S. Patent No. 1,448,251 and others) that vat colours, to which also belong the vat colours of the anthraquinone series, can be transformed into the acid sulphuric acid ester of their leuco compounds, i. e. into salts of these esters (ester salts) by treating the leuco compounds with sulphuric acid anhydride or a substance yielding SO₃ as esterifying agent in presence of a tertiary base.

It is also known, that aminoanthraquinone or derivatives thereof, such as α-aminoanthraquinone, with free or substituted amino group (see British Patent No. 261,139) and β-aminoanthraquinone with acylated amino group (see British Patent No. 312,243) can be transformed into ester salts by reduction and esterification of the enol groups thus formed.

From the wording of the above mentioned British Patent No. 312,243 it must be concluded that by this process from aminoanthraquinones with free amnio groups, mainly sulphaminic acids, and only small quantities of amino-anthrahydro - quinone - disulphuric acid esters would result, and that, in order to obtain the latter, the amino groups would have to be protected by acyl groups.

It has now been found that when treating 2-amino-anthraquinone or a derivative thereof with free amino group, after previous reduction, with sulphuric acid anhydride, or a substance yielding SO₃ as esterifying agent, in presence of a tertiary base, it is possible to introduce in one and the same operation sulphuric acid residues into the enolic group of the anthrahydroquinone as well as into the free amino group and to thus obtain the sulphaminic acid of the 2-aminoanthrahydroquinone disulphuric acid ester. In the case of α-aminoanthraquinones this introduction of a sulphuric acid residue into the free amino group can either not be effected at all or only in an incomplete way. The previous reduction of the aminoanthraquinone can be effected in different manners, for instance through alkaline vatting, through catalytic hydrogenation or with the use of a metal in the esterifying operation (see German Patent No. 473,471).

Whilst the ester salts of leuco compounds of vat dyestuffs of the anthraquinone series, or of the quinones in general, can be used either for dyeing or printing, the sulphaminic acids of the 2-aminoanthrahydroquinone disulphuric acid esters are particularly suitable for the production of valuable azo compounds. Surprisingly enough, it is possible to transform these compounds by their treatment with nitrite and acid and while maintaining the anthrahydroquinone sulphuric acid ester group, into the diazo compound of the aminoanthrahydroquinone disulphuric acid ester. By combining these diazo compounds with azo components, easily soluble azo compounds can be obtained which, by means of acid oxidation under splitting off of the sulphuric acid ester, are transformed into difficulty soluble, interesting dyestuffs containing the anthraquinone nucleus. It is true that the same bodies can also be obtained with aminoanthrahydroquinone disulphuric acid esters the amino group of which does not contain any sulphuric acid ester, by diazotizing, coupling and the other usual operations. It is, however, more complicated to produce the aminoanthrahydroquinone disulphuric acid esters with free amino group than the sulphaminic acids of the present process. In the former case the amino group must be acylated, the body must be reduced and esterified and the acyl group again be saponified.

According to the present process, however, it is possible, in one operation, to reduce and esterify the aminoanthraquinone and to directly use the raw solution of the obtained sulphaminic acid compound for further working up, for example for diazotization. For the mentioned reasons, these sulphaminic acids and the present process are interesting from a technical point of view.

The process is illustrated by the following examples:

Example 1

22.3 parts of 2-aminoanthraquinone are stirred at 15° C. into a reaction mixture of 50 parts of chloro-sulphonic acid and 200 parts of pyridine. The mass is heated up to 40° C.; then there are added slowly, while stirring, 20 parts of fine copper powder, and stirring is continued for further 6 hours at 40° C. Then 1000 parts of a solution containing 75 parts of sodium carbonate are added and the pyridine is removed by means of steam. The copper is separated by filtration. The resulting solution contains the sodium salt of the sulphaminic acid of 2-amino-anthrahydroquinone disulphuric acid ester, which corresponds probably to the following formula:

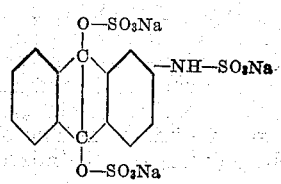

This solution shows a yellowish-brown coloration and an intense blue-green fluorescence. After having added some drops of caustic soda (30%) the solution gets darker and turns to a reddish-brown coloration with a yellow fluorescence.

It is to be supposed that the fluorescence is due to the presence of the enolic sulphuric acid ester groups because the corresponding aminoanthrahydroquinone disulphuric acid ester also shows a fluorescence in an aqueous solution, without, however, on addition of alkali showing a deepening of the coloration, nor an alteration thereof. It is further to be supposed that the deepening of the coloration and the alteration thereof on addition of an alkali is caused by the presence of the sulphaminic acid group, as the sulphaminic acid of 2-aminoanthraquinone in aqueous solution also shows the same phenomenon, but no fluorescence. The solution obtained according to this example, on addition of an alkali, shows a fluorescence as well as an alteration of the coloration, or a deepening thereof. It can therefore be concluded that the dissolved body contains both sulphaminic acid groups and enolic sulphuric acid ester groups. This conclusion is confirmed by the proportion of sulphuric acid to aminoanthraquinone found in the obtained body.

For the purpose of analysis, a part of the obtained solution is acidified and the present sulphuric acid is precipitated with an excess of barium chloride, the excess thereof being precipitated with soda. Then the solution is filtered. The same is free from SO₄-ions and Ba-ions. By adding pure hydro-chloric acid and iron chloride and by boiling for a few minutes, the insoluble 2-aminoanthraquinone is re-formed. The latter is separated by filtration and weighed. In the filtrate, the sulphuric acid split off is determined in the usual way. For 1 molecule of 2-aminoanthraquinone fairly exactly 3 molecules of sulphuric acid are found.

The formed sulphaminic acid of the 2-aminoanthrahydroquinone disulphuric acid ester cannot be separated from the aqueous solution with the usual agents, neither as alkali salt nor as free acid. It is preferable to use this solution directly for further working up, e. g. for diazotization.

Example 2

50 parts of 2-aminoanthraquinone are suspended in 500 parts of pyridine and reduced at ordinary temperature with hydrogen in the presence of 5 parts of a nickel catalyser (10%). The obtained solution of 2-aminoanthrahydroquinone is introduced into an addition product consisting of 500 parts of pyridine and 100 parts of chlorosulphonic acid, the reaction mass being mixed at 30° C. for 8 hours.

The further treatment is analogous to that described in Example 1.

Example 3

50 gr. of 2-aminoanthraquinone are pasted on with 2 litres of water and vatted at 50° C. with 100 gr. of caustic soda (30%) and 50 gr. of hydrosulphite (powder). From the red vat-solution, the yellow leuco body is precipitated by addition of diluted sulphuric acid and then filtered off. The still adhering water is removed by heating up with dimethylaniline, the thus obtained dry suspension of the leuco is introduced into an addition product consisting of 400 gr. of chlorobenzene, 300 gr. of dimethylaniline and 100 gr. of chlorosulphonic acid, and the mixture is heated up, while stirring, to 30° C. during 8 hours. Thereupon the dimethylaniline and chlorobenzene are removed under addition of 150 gr. of calcinated soda by means of steam and the solution is then filtered in order to separate the small quantity of not transformed aminoanthraquinone.

The solution shows the same properties as those described in Example 1.

Example 4

24 gr. of 2:6-diaminoanthraquinone are introduced at 15° C. into a reaction mixture of 60 parts of chloro-sulphonic acid and 250 parts of pyridine. The mass is heated up to 40° C. Then, while stirring, 20 parts of fine copper powder are slowly added and stirring is continued for further 6 hours at 40° C. Thereafter, 1000 parts of a solution containing 100 parts of sodium carbonate are added and the pyridine is removed by means of steam. Finally, the solution is separated from the copper by filtration.

The red-brown solution shows a bottle-green fluorescence; when adding a strong alkali thereto its coloration turns to dark red and at the same time becomes deeper. The fluorescence is then of a yellowish-brown shade.

The present process is also applicable to other aminoanthraquinones, especially halogenated aminoanthraquinones, such as for instance 1-chloro-2-aminoanthraquinone, 2-amino-3-bromoanthraquinone.

What I claim is:—

1. A process for producing sulphaminic acids of 2-aminoanthrahydroquinone disulphuric acid esters, consisting in reducing 2-aminoanthraquinones having a free amino group to the corresponding 2-aminoanthrahydroquinones and treating the latter in presence of a tertiary base with an esterifying agent comprising sulphur trioxide so as to introduce in the same operation sulphuric acid residues into the enolic groups of the 2-aminoanthrahydroquinones as well as into their free amino group.

2. A process for producing sulphaminic acids of 2-aminoanthrahydroquinone disulphuric acid esters, consisting in treating 2-aminoanthraquinones having a free amino group in presence of a tertiary base with an esterifying agent comprising sulphurtrioxide and with a metal in order to perform reduction and esterification in one operation.

3. A process for producing sulphaminic acids of 2-aminoanthrahydroquinone disulphuric acid esters, consisting in reducing 2-aminoanthraquinones having a free amino group to the corresponding 2-aminoanthrahydroquinones and treating the latter with chlorosulphonic acid in the presence of a tertiary base for esterifying purposes.

4. A process for producing sulphaminic acids of 2-aminoanthrahydroquinone disulphuric acid esters, consisting in treating 2-aminoanthraquinones having a free amino group in presence of a tertiary base with an esterifying agent comprising sulphurtrioxide and with metallic copper.

5. A process for producing the sulphaminic acid of 2-aminoanthrahydroquinone disulphuric acid ester, consisting in treating 2-aminoanthraquinone in presence of a tertiary base with chlorosulphonic acid and a metal.

6. As new articles of manufacture the herein described sulphaminic acids of 2-aminoanthrahydroquinone disulphuric acid esters corresponding to the following general formula:

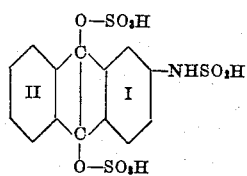

wherein the nuclei I and II may be halogenated, being in the form of alkali salts easily soluble in water, giving solutions of yellowish-brown to red-brown coloration which shows intense fluorescence, and, on addition of alkali, a deepening and alteration of the color, and capable of being transformed by nitrite and acid—while maintaining the anthrahydroquinone disulphuric acid ester groups—into the corresponding diazo compounds of 2-aminoanthrahydroquinone disulphuric acid esters.

ROGER RATTI.